Feb. 22, 1966     E. J. HAEDIKE ETAL     3,236,172
FLASH VAPORIZER
Filed Dec. 18, 1962     3 Sheets-Sheet 1
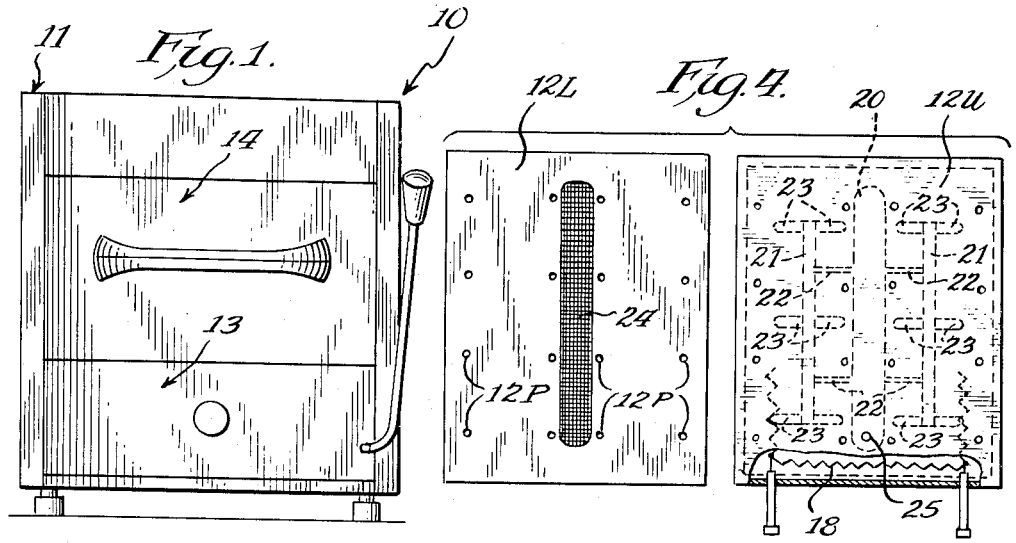
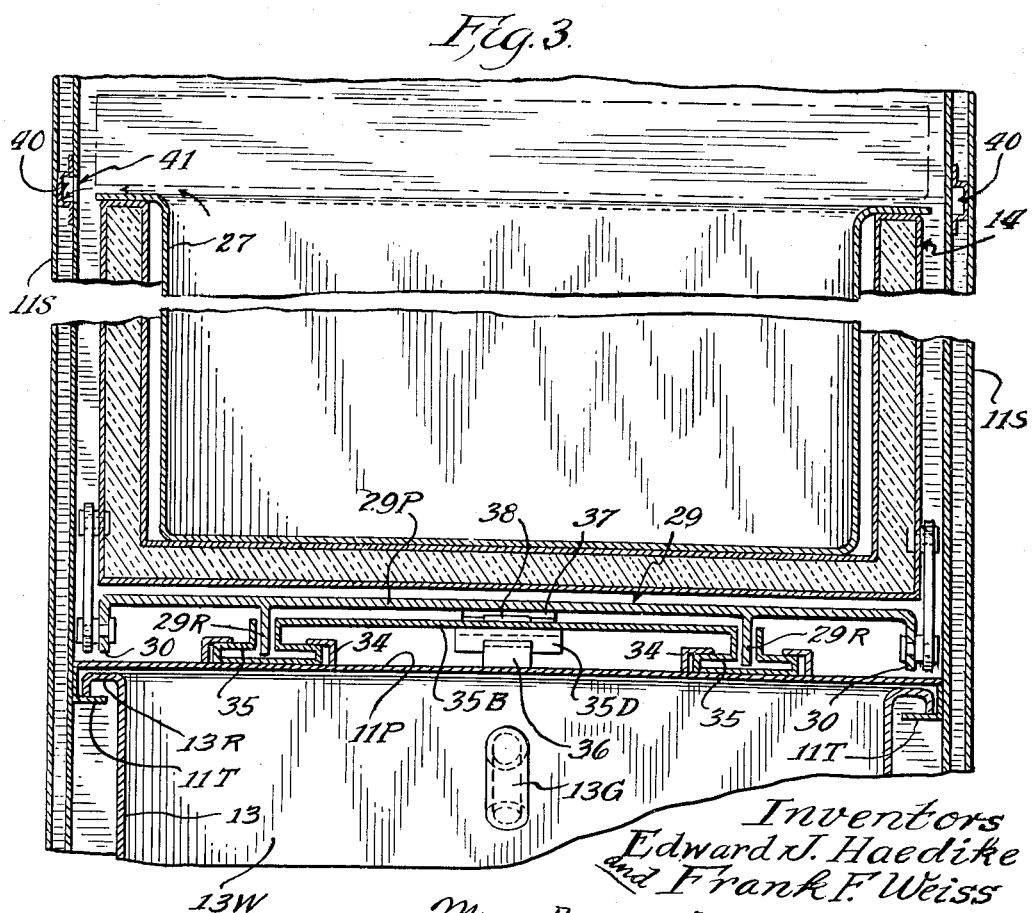
Inventors
Edward J. Haedike
and Frank F. Weiss
By Mann, Brown & McWilliams,
Attys.

Inventors
Edward J. Huedike
and Frank F. Weiss
By Mann, Brown & McWilliams.
Attys.

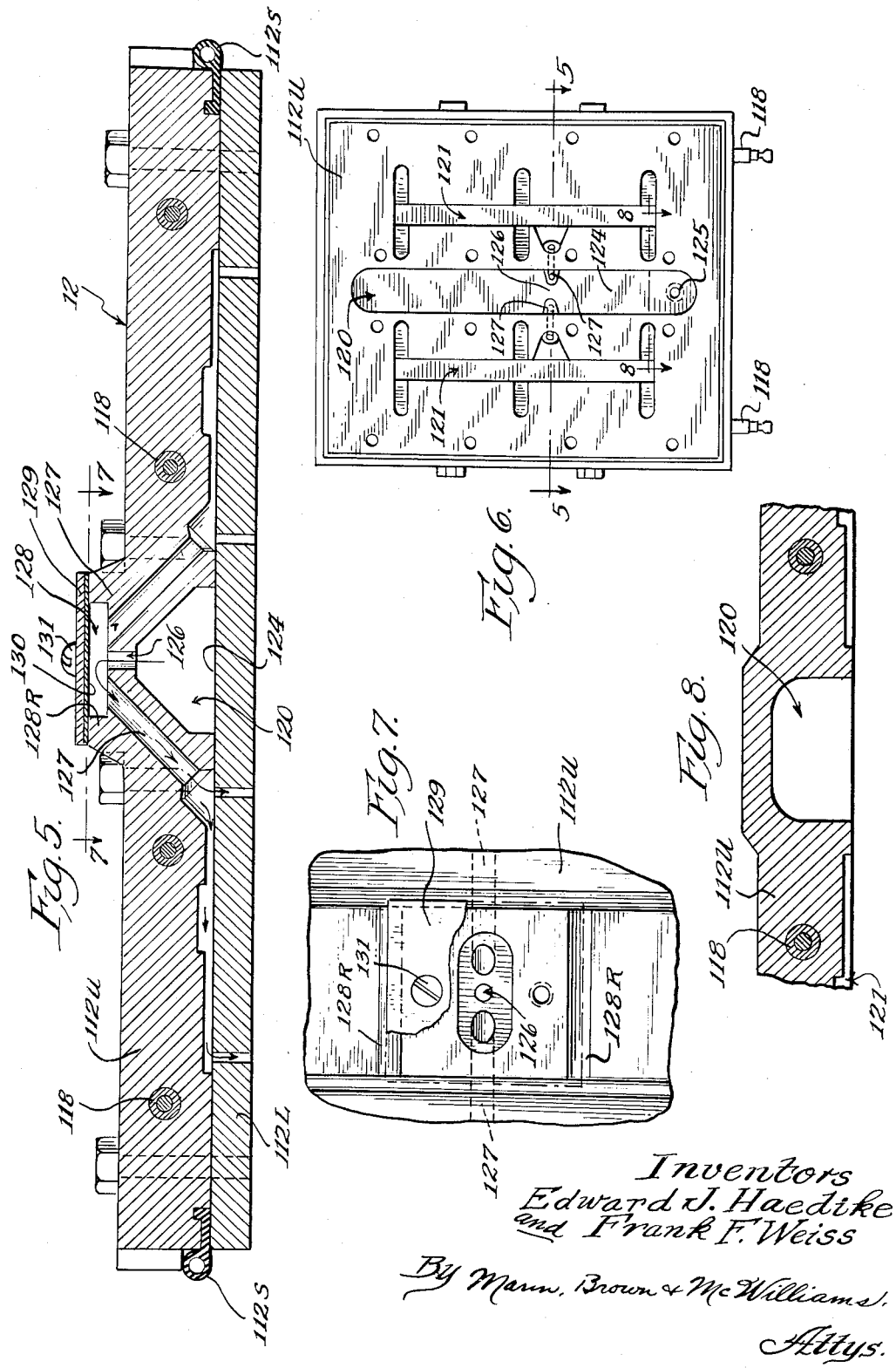

United States Patent Office 3,236,172
Patented Feb. 22, 1966

3,236,172
FLASH VAPORIZER
Edward Julius Haedike, Arlington Heights, and Frank F. Weiss, Franklin Park, Ill., assignors to Mid-Continent Metal Products Co., a corporation of Illinois
Filed Dec. 18, 1962, Ser. No. 245,519
11 Claims. (Cl. 99—234)

This invention relates to a flash vaporizer unit and more particularly is concerned with providing an improved flash vaporizer unit for steam treating of food products.

In application to food treatment it is important to provide efficient flash vaporization of water at temperatures on the order of 350° F. to assure production of suitably dry steam. In the prior art, difficulty has been experienced in meeting this goal. Moreover, it is important to provide a properly insulated and effectively sealed pressure chamber in which to treat the food products with greatest efficiency and safety.

In the present market, flash steamer units are generally of the hinged cover type and access to both the water reservoir compartment and the food steaming compartment is inconvenient. Filling of the water compartment through a narrow spout is tedious. Cleaning of the water compartment is even more difficult. Access to the food steaming compartment requires lifting of a hinged cover and unnecessarily exposes the operator to contact with accidentally discharged steam and/or to extremely hot surfaces that become exposed when the cover is raised.

Accordingly, the principle objects of the present invention are to provide an improved flash vaporizer unit: that is capable of operating to convert water to steam substantially instantaneously at temperatures on the order of 350° F.; that provides a pressure chamber that is effectively sealed and shielded against dangerous escape of high temperature vapor; that provides a pressure chamber normally maintained at high temperature and effectively insulated against excessive heat loss; that provides a pressure chamber that is conveniently accessible without unduly exposing the operator of danger of burning; and that provides a water reservoir that is conveniently accessible for filling and cleaning.

Generally speaking in the preferred embodiment of the invention, a flash vaporizer unit for steam treatment of food products is provided in the form of a cabinet having individual pull out drawers providing a water compartment and a food compartment immediately thereabove. A flash vaporization element is provided within the top of the unit to overlie and sealingly engage the food compartment and cooperably define an enclosed chamber. Steam is generated in the flash vaporization element and injected into the food compartment which functions as a pressure chamber to accelerate the desired heating action.

Other objects and advantages will become apparent during the course of the following description.

In the accompanying drawings:

FIG. 1 is a front elevational view of a preferred form of flash vaporizer unit;

FIG. 3 is taken on line 3—3 of FIG. 2, and shows the unit with intermediate height portions thereof broken out;

FIG. 4 is a plan view of the vaporization plates;

FIG. 5 is a transverse sectional view illustrating an alternative form of vaporization element;

FIG. 6 is an underneath face view of the upper vaporization plate of FIG. 5;

FIG. 7 is a fragmentary detailed plan view taken as indicated on the line 7—7 of FIG. 5; and FIG. 8 is a fragmentary detailed cross-sectional view taken as indicated on the line 5—5 of FIG. 6.

Figure 2:
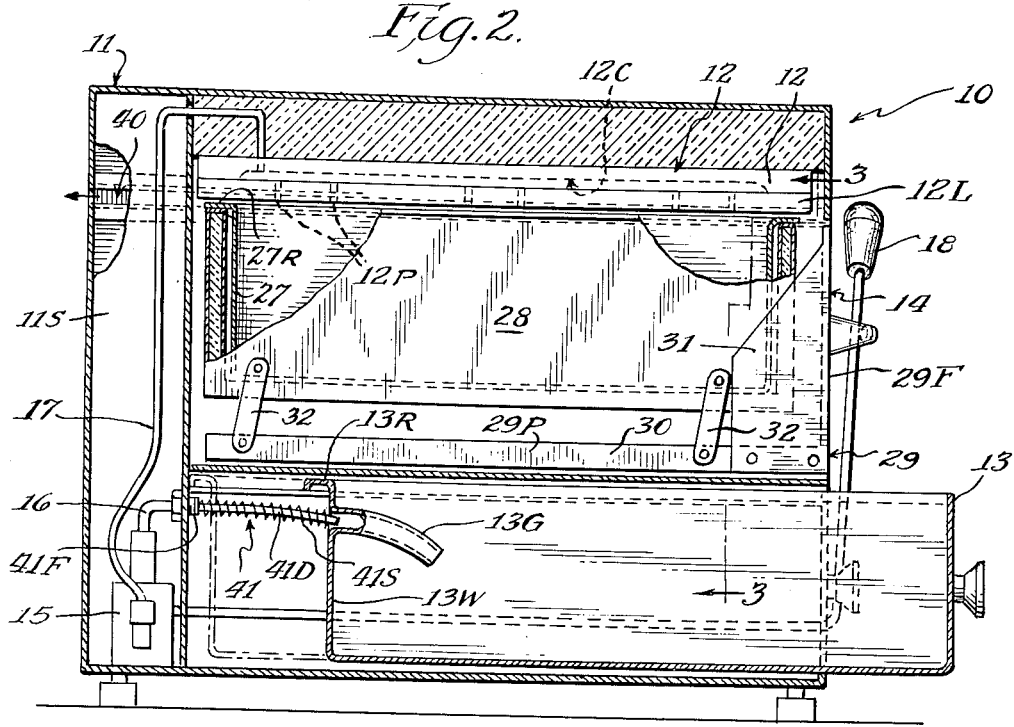
FIGS. 2 and 2A are enlarged side sectional views of the unit showing the drawers in changed position.

Referring now to the drawings, the general arrangement of a preferred constructional embodiment of a flash vaporizer unit constructed in accordance with this invention is shown in FIGS. 1 and 2 for purposes of illustrative disclosure. The illustrated unit 10 is particularly adapted for use as a food steamer and as will become clear it provides a food receiving compartment that normally operates at elevated temperature so that the appliance may not only be used as a refreshener for bakery products and the like but also has wide application for actual cooking of food.

The illustrated food steamer comprises a unitary cabinet structure 11 open at the front, a flash vaporization element 12 (see FIG. 2) within the upper end of the cabinet and providing a flash vaporization chamber 12C having generally downwardly directed discharge ports 12P, an open top drawer 13 shiftable horizontally fore and aft within the lower end of the cabinet and providing a water reservoir, and an open top drawer assembly 14 occupying the region within the cabinet between the vaporization element 12 and the water drawer 13 and also being shiftable horizontally fore and aft in the cabinet to provide a food receiving compartment.

The cabinet is provided with a rear mounting space in which is located a manually operable metering pump unit 15 having an inlet line 16 adapted for communication with water in the drawer 13 and having an outlet line 17 leading into the flash vaporization chamber 12C. A manual operating handle 18 for the pump 15 is provided at the front of the cabinet and is connected by a rotatably mounted rod that extends rearwardly through the cabinet and is connected through suitable linkage (not shown) to actuate the metering pump 15 and inject a charge of liquid into the vaporization chamber 12C wherein it is converted to steam and discharged instantaneously into the food compartment.

The simplicity of the basic cabinet and drawer arrangement offers a number of practical advantages in the use of the appliance. The water drawer 13 is conveniently accessible for filling and cleaning, the food compartment drawer assembly 14 is similarly conveniently accessible for insertion and removal of the food, and the flash vaporization element 12 may be mounted permanently within the upper end of the cabinet 11 thus facilitating and simplifying its function and also enabling adequate masking of the extremely hot surfaces involved. Finally, the flat top wall of the cabinet being a fixed structure serves as a useful support surface.

The flash vaporization element 12 employed in this invention is comprised of bolted assembly upper and lower plates 12U and 12L, respectively, superposed in broad faced abutting relationship and having suitable edge sealing facilities to provide therebetween a completely sealed flash vaporization chamber 12C that is distributed throughout a substantial interface region of the plates. The plates are of a heat conducting material such as cast steel or aluminum and a heater wire 18 is embedded in the upper plate to generate heat directly wtihin the flash vaporization element 12.

Portions of the lower face of the upper plate 12U are relieved to provide a larger center distribution channel 20 flanked by smaller side distribution channels 21 each of which is connected to the center channel by a number of flow passages 22 and each of which has lateral branches 23 arranged for registry with the discharge ports 12P provided in the lower plate.

The upper face of the lower plate has a large central surface portion thereof corresponding to the central distribution channel of the upper plate provided with a coating 24 of a material having a characteristic of being wettable by water substantially more easily than are metals such as steel and aluminum. For ease of application numerous types of spray paint are suitable but plastic compositions such as epoxy resin formulations may also be employed.

The upper plate 12U is provided with an inlet port 25 for the charge of water supplied from the metering pump 15, with this port being located at one end of the large center distribution channel so that the incoming charge of water deposits directly upon the coating 24 provided on the lower plate.

In the case of a food steamer it is desirable to operate the vaporization element 12 at a temperature on the order of 350° F. in order to provide suitably dry steam. At this temperature range, if the water charge is deposited directly on a metal surface such as steel or aluminum the conversion to steam is erratic and inefficient presumably because the water is unable to wet the metal surface sufficiently rapidly. It is assumed that upon initial localized contact of the water with the heated surface, a cushioning film of steam spreads throughout the surface and causes water bubbles of various sizes to dance about wildly without actually contacting the heated surface. This condition delays conversion of the full charge to steam. The provision of a coating of a material capable of being rapidly wet by water enables the desired rapid conversion to steam to occur substantially instantaneously and avoids the intervention of the film of steam.

The drawer assembly 14 provides an open top article or food receiving chamber into which is directed the steam discharged through the ports 12P of the vaporization element. The drawer assembly 14 includes an open top pan 27 in which the food is actually disposed. The pan is of aluminum or other suitable heat conducting material and has a marginal rim 27R bordering its open top and arranged for full line contact with the high temperature lower face of the vaporization element 12. Heat is thus conducted directly into the pan body to maintain it at an elevated temperature independently of the steam charges. This provides a cooking chamber of sealed form and when steam is injected it is retained at an elevated pressure and the heating effect is accelerated much like the action of a pressure cooker.

The pan 27 is mounted in a drawer body 28 of heat insulated wall construction and is supported therein by engagement of the pan rim upon the upper edge of the vertical walls of the drawer body. The drawer body 28 rides on a drawer slide mechanism 29 that includes a drawer face 29F, and a horizontal drawer plate 29P. The drawer plate 29P extends substantially the full width and depth of the drawer compartment and is provided with depending side flanges 30 connected to the drawer face 29F by angle elements 31. Parallel pairs of swing links 32 having opposite ends thereof pivoted in fore and aft spaced relation to the side flanges 30 and to the drawer body 28 guide movement of the drawer body along an upwardly curved parallel motion path.

Figure 2A:
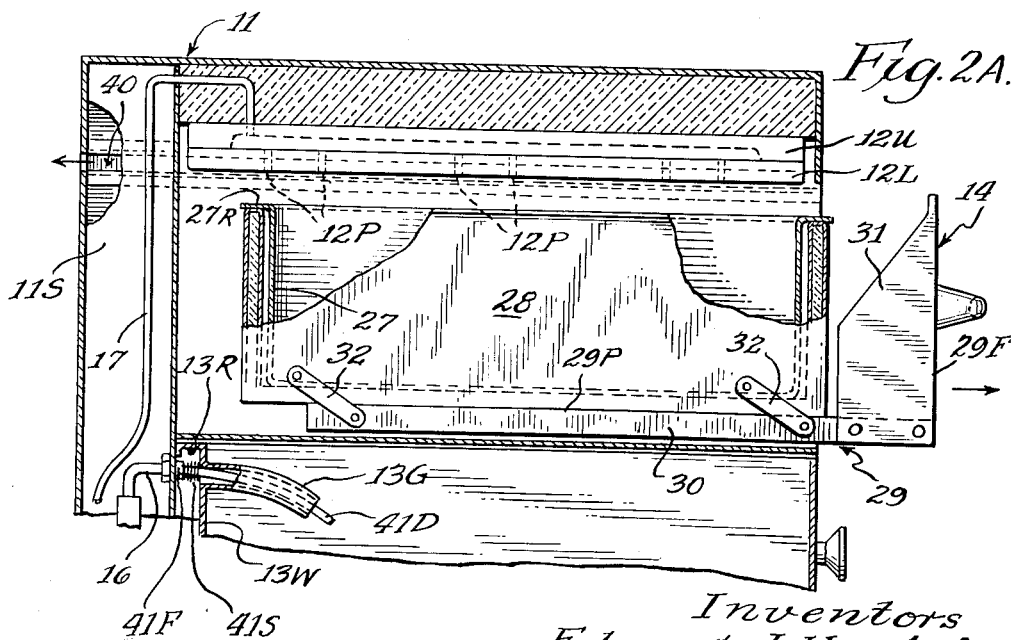

When the drawer 14 is opened or withdrawn the drawer body 28 rests upon the drawer plate 29P and the swing links 32 are in the position in which they are illustrated in FIG. 2A. When the drawer 14 is moved inwardly to a fully closed position the inner end of the drawer first engages the inner end of the cabinet causing the drawer to undergo swinging movement under the control of the links 32 until the links assume the position in which they are illustrated in FIG. 2. In this position the links are slightly over center and abut against the angle elements 31 and the pan rim 27R is held in tight abutment against the vaporization element 12.

In the preferred form, an intermediate horizontal partition 11P is mounted within the cabinet and carries a pair of guideway channels 34 extending fore and aft in the cabinet in laterally spaced relation. Slidable tracks 35 are arranged for movement in these guideways and carry cross brace structure 35B having a resilient detent element 35D for engagement with a locating stop 36 positioned on the partition 11P. Similarly the drawer plate 29P has depending rails 29R slidable fore and aft in the tracks 35 and the drawer plate is equipped with a resilient detent 37 cooperating with a stop 38 carried by the cross brace structure 35B. The described mechanism regulates withdrawal of the drawer assembly.

It does occur at times, as indicated in FIG. 3, that some steam escapes between the pan rim 27R and the vaporization element 12 and for this purpose steam discharge ducts 40 are provided within the side walls 11S of the cabinet. Accordingly, the inner face of the cabinet side walls are provided with openings 41 at the level assumed by the pan rim when in its elevated position. These openings lead into the duct runways provided within the sidewalls 11S and arranged to open through the rear corners of the cabinet (see FIGS. 2 and 2A). The water drawer 13 has a marginal rim 13R about its top and supported in sliding engagement on track defining side angles 11T fixed horizontally within the cabinet to underlie the side edges of the partition 11P.

To enable removal and replacement of the water drawer 13 without need for attending to reconnection of the inlet feed line 16 with the reservoir water, the rear wall 13W of the drawer is equipped with a fitting in the form of a tubular guide 13G opening through the rear wall 13W and curving generally forwardly and downwardly to provide a passage arranged to receive a liquid pick-up assembly 41 that comprises a flexible dip tube 41D having an attachment fitting 41F at its rear end engaged in the rear cabinet wall and connected to the pump in-feed line 16. The dip tube 41D is encircled by a coil spring 41S that is anchored at one end to the fitting 41F and that has substantial lengthwise rigidity to support the dip tube at a position for registry with the rear end of the passage defined by the guide 13G.

During the insertion of the water drawer the coil spring 41S finds registry with the fixes within the rear of the guide 13G and enables the dip tube 41D to enter full length through the guide passage for immersion within the water contained in the drawer 13.

An improved form of vaporization element 12 is shown in detail in FIGS. 5 to 8. The vaporization element includes a bolted assembly of upper and lower plates 112U and 112L, respectively, superposed in broad-faced abutting relationship and having a silicone strip 112S compressed between marginal edges of the plates and extending entirely around the perimeter of the unit to provide an edge seal. The plates 112U and 112L are of a heat conducting material such as cast steel or aluminum and a heater element 118 is disposed to extend through the upper plate to heat the same internally.

As pictured in FIG. 6, portions of the lower face of the upper plate 112U are relieved to provide a large center distribution channel 120 flanked by smaller side distribution channels 121. The water inlet port to the center channel 120 is shown at 125 in FIG. 6 and the surface of the lower plate that borders the center channel is again provided with a coating 124 of paint or similar wetting materials as explained previously.

Conversion of water to steam in the center channel 120 results in an accumulation of residual solids from the dissolved salts and other substances carried in the water and to avoid the possibility of blockages and thereby extend the life of the vaporization element, the center channel 120 is made of substantial depth and communicates with the side channels 121 via a vertical bore 126 that feeds obliquely downwardly directed side passages 127. The bore 126 and passages 127 communicate through an upper chamber 128 bonded by four edge ribs 128R and sealed by a cover plate 129 and gasket 130. Mounting screws 131 secure the cover plate 129 in sealed relation to the ribs 128R.

The main length of the center channel 120 has a cross-sectional shape as shown in FIG. 8 and intermediate along the center channel its cross-section is reduced as shown in FIG. 5 to afford sufficient wall thickness at the region of the passages 127.

With this arrangement, the water entering at one end of the center channel and vaporizing to steam undergoes a rapid expansion and tends to blow all solid particles to the far end of the center channel such that any build-up occuring there will not block the steam travel passage 126 leading to the side channels. The steam travel passage 126 moreover is arranged so as to inhibit the tendency of the solid particles to travel it. The steam discharge ports are shown at 112P and again are directed vertically downwardly from the lower plate 112L. In FIGS. 5 and 6 edge clips 132 are shown affixed to the upper plate 112U and may be suitably tapped to receive locating screws for mounting the vaporization element within the top of the cabinet.

It should be understood that the description of the preferred form of the invention is for the purpose of complying with Section 112, Title 35, of the U.S. Code and that the appended claims should be construed as broadly as the prior art will permit.

What is claimed is:

1. A flash steamer unit comprising a cabinet having a stationarily mounted flash vaporization element providing a flash vaporization chamber spanning its upper end and having downwardly directed discharge ports, a liquid reservoir within the lower end of the cabinet and spaced beneath said element, means for delivering a metered charge of liquid from said reservoir to said chamber for conversion instantaneously to vapor discharging through said ports, a drawer assembly horizontally slidable in said cabinet and occupying the region between said flash vaporization element and said reservoir, said assembly comprising a pan having an open top bordered by a marginal rim that is upwardly engageable in substantially sealed relationship against said flash vaporization element to define conjointly therewith a pressure retaining chamber, drawer slide mechanism movable horizontally in said steamer unit to effect insertion and withdrawal of said pan, and means mounting said pan to said drawer slide mechanism and operative in response to said drawer assembly being inserted fully into said steamer unit to raise said pan to a position in which the pan rim engages said vaporization element.

2. A steamer unit in accordance with claim 1 wherein said liquid reservoir comprises an open top drawer slidably horizontally in said cabinet and said liquid delivering means includes a dip tube liquid pick up disposed within said steamer to enter said last named drawer during and in response to insertion thereof into said cabinet.

3. In a flash steamer unit wherein a flash vaporization element has a broad lower surface overlying an open top article receiving compartment and said element provides a flash vaporization chamber having ports opening through said surface for discharge into said compartment, the improvement wherein a drawer assembly slidable horizontally in said steamer unit constitutes said compartment and comprises a pan having an open top bordered by a marginal rim that is engageable in substantially sealed relation against said surface to define conjointly therewith a pressure retaining chamber, drawer slide mechanism movable horizontally in said steamer unit to effect insertion and withdrawal of said pan, and means mounting said pan to said drawer slide mechanism and operative in response to said drawer assembly being inserted fully into said steamer unit to raise said pan to a position in which the pan rim engages said surface.

4. In a flash steamer unit in accordance with claim 3 and wherein said flash vaporization element comprises upper and lower plates of heat conducting material superposed in broad faced abutting relationship and providing therebetween a flash vaporization chamber configuration distributed throughout a substantial interface region of said plates, said lower plate having said discharge ports opening downwardly therethrough from a plurality of points spaced about said flash vaporization chamber, said lower plate having a coating fixed upon an upwardly directed interface surface portion thereof that borders a substantial region of said chamber, said coating being of a material having a characteristic of being wettable by water substantially more easily than are metals such as steel and aluminum, and said element having a liquid inlet opening into said chamber to enable deposit of liquid directly onto said coating.

5. In a flash steamer unit wherein a flash vaporization element has a broad lower surface overlying an open top article receiving compartment and said element provides a flash vaporization chamber having ports opening through said surface for discharge into said compartment, the improvement wherein a drawer assembly slidable horizontally in said steamer unit constitutes said compartment and comprises a heat insulated drawer body, a pan of heat conducting material removably disposed in said drawer body and having an open top bordered by a marginal rim that is in overlying supported relation on upper extremities of said drawer body, a drawer slide mechanism movable horizontally in said steamer unit to effect insertion and withdrawal of said drawer assembly, and means mounting said drawer body to said drawer slide mechanism and operative in response to said drawer slide mechanism being inserted fully into said steamer unit to raise said drawer body and thereby elevate said pan to engage said pan in substantially sealed heat receiving relation against said surface and define conjointly therewith a pressure retaining chamber.

6. In a flash steamer unit wherein a flash vaporization element has a broad lower surface overlying an open top article receiving compartment and said element provides a flash vaporization chamber having ports opening through said surface for discharge into said compartment, the improvement wherein a drawer assembly slidable horizontally in said steamer unit constitutes said compartment and comprises a heat insulated drawer body, a pan of heat conducting material removably disposed in said drawer body and having an open top bordered by a marginal rim that is in overlying supported relation on upper extremities of said drawer body, a drawer slide mechanism movable horizontally in said steamer unit to effect insertion and withdrawal of said drawer assembly, and means including parallel acting pairs of swing links having opposite ends thereof pivoted in fore and aft spaced relation to said drawer slide mechanism and to said drawer body and operative in response to said drawer slide mechanism being inserted fully into said steamer unit to swing said drawer body along an upwardly curved parallel motion path and engage said pan in substantially sealed heat receiving relation against said surface and define conjointly therewith a pressure retaining chamber.

7. In a flash steamer unit, a food compartment, a flash vaporization element providing a flash vaporization chamber overlying the food compartment and having discharge ports directed downwardly theretoward, a liquid reservoir beneath said food compartment, and means for delivering a metered charge of liquid from said reservoir to said chamber for conversion instantaneously to vapor for jet discharge through said ports; the improvement wherein said liquid reservoir comprises an open top drawer shiftable horizontally fore and aft in said flash steamer unit and having a guide fitting at its rear providing a passage open towards the rear and leading generally forwardly and downwardly, and said means includes a flexible dip tube liquid pick-up disposed within the rear of said unit and projecting forwardly to register with and enter said passage during insertion of the drawer into said steamer unit with said dip tube assuming a generally forwardly and downwardly directed configuration like said guide fitting to establish communication with liquid in said reservoir.

8. In a flash steamer unit, a food compartment, a flash vaporization element providing a flash vaporization chamber overlying the food compartment and having discharge ports directed downwardly theretoward, a liquid reservoir beneath said food compartment, and means for delivering a metered charge of liquid from said reservoir to said chamber for conversion instantaneously to vapor for jet discharge through said ports; the improvement wherein said liquid reservoir comprises an open top drawer shiftable horizontally fore and aft in said flash steamer unit and having a guide fitting at its rear providing a passage open towards the rear and leading generally forwardly and downwardly, and said means includes an elongated coil spring disposed within the rear of said unit and projecting generally forwardly to register with said passage, said spring housing and guiding a flexible dip tube liquid pick up to enable said dip tube to enter said passage during insertion of the drawer into said steamer unit.

9. A flash steam cooking device for warming or cooking foods by steam under super-atmospheric pressure, said cooker comprising a cabinet, a flash steam vaporizing unit stationarily mounted in the cabinet and having means for maintaining the unit at an elevated temperature for the instantaneous production of steam when the unit receives a charge of water, a water reservoir in the cabinet, metering means and pipe means associated therewith for delivering a selected charge of water to the vaporizing unit as desired, drawer means located beneath the vaporizing unit having a food container mounted therein with the upper margin thereof adapted to be sealed against said vaporizing unit, means for moving the food container upwardly into sealing relationship with the vaporizing unit when the drawer is closed, said vaporizing unit having steam jet orifices communicating with the container when the container and vaporizing unit are in sealed operative relationship.

10. A flash steam cooking device as set forth in claim 9 in which said water reservoir comprises a drawer mounted in the cabinet below said food container drawer means, said water reservoir drawer, when closed, being operatively associated with said metering means and said pipe means for delivering metered quantities of water to said vaporizing unit, and when open, being readily accessible for refilling with water.

11. A flash steam cooking device as set forth in claim 10 in which said metering means and pipe means include a flexible tube mounted in the cabinet and a guide member carried on the water reservoir drawer.

References Cited by the Examiner
UNITED STATES PATENTS

| | | | |
|---|---|---|---|
| 550,516 | 11/1895 | Leigh | 126—369.2 |
| 1,400,221 | 12/1921 | Kaufer | 126—20 X |
| 1,627,734 | 5/1927 | Gavaza | 137—152 X |
| 1,829,839 | 11/1931 | Ratschkowsky | 122—41 |
| 1,946,963 | 2/1934 | Brouillet | 126—20 |
| 2,161,613 | 6/1939 | Coffing | 122—41 |
| 2,202,459 | 5/1940 | Link | 285—9 X |
| 2,353,604 | 7/1944 | Waring et al. | 38—77 |
| 2,418,511 | 4/1947 | Hume | 38—77 |
| 2,499,184 | 2/1950 | Finlayson | 38—77 |
| 2,665,564 | 1/1954 | Janos et al. | 312—270 X |
| 2,683,320 | 7/1954 | Morton | 38—77 |
| 2,724,628 | 11/1955 | Schrader | 312—270 |
| 2,942,926 | 6/1960 | Pavelka | 312—270 |
| 2,967,365 | 1/1961 | Extale et al. | 38—77 |
| 2,980,099 | 4/1961 | Klemm | 99—234 |
| 3,030,486 | 4/1962 | Lashley | 126—20 X |
| 3,045,371 | 7/1962 | Kurlinski | 38—77 |
| 3,069,994 | 12/1962 | Lewis | 99—234 |

FOREIGN PATENTS

| | | |
|---|---|---|
| 181,695 | 4/1955 | Austria. |
| 23,971 | 19/1893 | Great Britain. |

WALTER A. SCHEEL, *Primary Examiner.*

JEROME SCHNALL, ROBERT E. PULFREY,
*Examiners.*